United States Patent
Millet et al.

(10) Patent No.: US 6,929,668 B2
(45) Date of Patent: Aug. 16, 2005

(54) PROCESS FOR PRODUCTION OF HYDROGEN BY PARTIAL OXIDATION OF HYDROCARBONS

(75) Inventors: Cyrille Millet, Lyon (FR); Daniel Gary, Montigny le Bretonneux (FR); Philippe Arpentinier, Le Perray en Yvelines (FR)

(73) Assignee: L'Air Liquide, Societe Anonyme a Directoire et Conseil de Surveillance pour l'Etude et l'Exploitation des Procedes Georges Claude, Paris (FR)

( * ) Notice: Subject to any disclaimer, the term of this patent is extended or adjusted under 35 U.S.C. 154(b) by 415 days.

(21) Appl. No.: 10/204,463
(22) PCT Filed: Feb. 22, 2001
(86) PCT No.: PCT/FR01/00519
§ 371 (c)(1), (2), (4) Date: Aug. 21, 2002
(87) PCT Pub. No.: WO01/62662
PCT Pub. Date: Aug. 30, 2001

(65) Prior Publication Data
US 2003/0009943 A1 Jan. 16, 2003

(30) Foreign Application Priority Data
Feb. 24, 2000 (FR) .......................................... 00 02309

(51) Int. Cl.$^7$ ................................................. C01B 3/38
(52) U.S. Cl. ...................... 48/198.7; 423/415; 423/416; 423/417; 423/418; 252/273; 48/200; 48/206; 48/207; 48/208; 148/16; 148/17; 148/18; 148/19; 148/20; 518/702; 518/703; 518/704
(58) Field of Search ................................ 423/415–418; 252/273; 48/206, 197 R; 148/16–20; 518/702–4

(56) References Cited
U.S. PATENT DOCUMENTS

| 5,057,164 A | * | 10/1991 | Nilsson et al. ............... 148/633 |
| 5,073,356 A | * | 12/1991 | Guro et al. ............... 423/418.2 |
| 5,160,456 A | * | 11/1992 | Lahn et al. .................. 252/373 |
| 5,238,057 A | * | 8/1993 | Schelter et al. .............. 165/158 |
| 5,486,313 A | | 1/1996 | De Jong et al. |
| 5,538,706 A | * | 7/1996 | Kapoor et al. ........... 423/418.2 |
| 5,624,964 A | * | 4/1997 | Cimini et al. ................ 518/704 |
| 5,720,901 A | | 2/1998 | De Jong et al. |
| 5,746,985 A | | 5/1998 | Takahashi |
| 5,968,457 A | | 10/1999 | Van Den Sype et al. |

FOREIGN PATENT DOCUMENTS

| WO | WO90/06282 A1 | 6/1990 |
| WO | WO99/15483 A1 | 4/1999 |

OTHER PUBLICATIONS

Kikuchi, "Steam Reforming and Related Reactions in Hydrogen-permselective Membrane Reactor"; *Sekiyu Gakkaishi* (Dept. of Applied Chemistry, School of Science and Engineering, Waseda University, 3-4-1 Okubo, Shinjuk-ku, Tokyo 169 (Mar. 22, 1996); vol. 39, No. 5, 1996.

* cited by examiner

Primary Examiner—Alexa Doroshenk
Assistant Examiner—Vinit H. Patel
(74) Attorney, Agent, or Firm—Burns, Doane, Swecker & Mathis, L.L.P.

(57) ABSTRACT

The invention concerns a method for producing a gas mixture containing hydrogen and carbon monoxide, and optionally nitrogen, from at least a hydrocarbon such as methane, propane, butane or LPG or natural gas, which comprises performing a partial catalytic oxidation of one or several hydrocarbons, at a temperature of 500° C., at a pressure of 3 to 20 bars, in the presence of oxygen or a gas containing oxygen, such as air, to produce hydrogen and carbon monoxide. Recuperating the gas mixture, which can subsequently be purified or separated, by pressure swing adsorption, temperature swing adsorption or by permeation, to produce hydrogen having a purity of at least 80% and a residue gas capable of supplying a cogeneration unit. In another embodiment, the gas mixture can subsequently be purified of its water vapor impurities and carbon dioxide to obtain a thermal treatment atmosphere containing hydrogen, carbon monoxide and nitrogen.

43 Claims, 4 Drawing Sheets

PROCESS FOR PRODUCTION OF HYDROGEN BY PARTIAL OXIDATION OF HYDROCARBONS

BACKGROUND OF THE INVENTION

1. Field of the Invention

This invention relates to a process for production of a gaseous mixture containing at least hydrogen ($H_2$) and carbon monoxide (CO) starting from at least one hydrocarbon, in which a partial catalytic oxidation of at least one hydrocarbon is made in the presence of oxygen or a gas containing oxygen, to produce hydrogen and carbon monoxide.

2. Description of the Related Art

Hydrogen gas is widely used, particularly in the chemicals industry.

Thus, the annual global production of hydrogen is of the order of 50 billion $m^3$, 95% of which is used in refining and the petrochemicals industry for the synthesis of methanol (MeOH) and the production of ammonia ($NH_3$).

Therefore marketable hydrogen, in other words non-captive production, only represents a few percent of this global production.

It is becoming increasingly necessary to have production sources directly on the user site, considering increasing requirements for marketable hydrogen of the order of about +10% per year, and future needs felt in industry in general and particularly in chemicals industry, petrochemicals industry, metallurgy, electronics, fine chemicals industry, in the decentralized production of energy, clean and non-polluting transport using fuel cells and taking account of problems raised by the distribution infrastructure for hydrogen and particularly for its transport, storage and related safety problems.

Hydrogen is produced in large quantities mainly at refiners and major chemical companies using different known methods namely:

- by reforming of hydrocarbons originating from oil fields (naphtha) or natural gas using steam. This is a highly endothermic reaction carried out at high pressure, for example of the order of 15 to 35 bars, at between 800° C. and 900° C. and with one or more catalysts. The burners are located outside the catalytic beds and the hydrocarbon/steam mixture is preheated due to heat exchangers that use hot combustion gases. This process can achieve $H_2$/CO production ratios of between 3 and 4 depending on the steam flow.
- by mixed reforming; this a auto-thermal process in which the thermal energy necessary for reforming with steam on a catalyst may for example be supplied by partial combustion of $CH_4$ into $CO_2$ and $H_2O$. On the other hand, the $H_2$/CO ratio is lower than it is for production by reforming with steam, in other words of the order of 2.2 to 2.5.
- by partial oxidation of hydrocarbons. This process does not require a catalyst. Combustion takes place at between 1300° C. and 1400° C. with little or no steam. This process is exothermal but produces less hydrogen than the previous processes. Furthermore, the hydrogen production reaction must be maximised by conversion of CO in the presence of steam and on a catalyst, according to the following reaction (1):

$$CO + H2O \rightarrow CO2 + H2 \qquad (1)$$

Consequently for production of hydrogen alone, reforming with steam is the best process at the moment, particularly when it is associated with the gas to water conversion reaction and a PSA (Pressure Swing Adsorption) process for purification of the hydrogen thus produced.

The energy efficiency of this process is excellent, in other words up to 85% in large installations by making use of steam that is available in all cases.

Apart from specific production units, marketable hydrogen and therefore hydrogen in large quantities, is also obtained from other sources, namely:

- recovery of hydrogen produced during dehydrogenisation operations in chemicals industry and refining, for example by catalytic reforming and cracking;
- reuse of part of the hydrogen produced at captive producers when it is in excess. However, this source is shrinking due to the increasing needs of hydrogen firstly for removal of sulphide contents to satisfy environmental standards that are being adopted, and secondly for hydrogenisation treatment of increasingly heavy contents.
- from production of coke in steelworks
- electrolysis of sodium chloride (NaCl) in which hydrogen is produced at the same time as $Cl_2$.

There are also some small hydrogen production units based on the decomposition of molecules rich in hydrogen atoms, particularly thermal cracking of $NH_3$, by catalytic reforming of $CH_3OH$ or by electrolytic dissociation of $H_2O$.

However, hydrogen production from $NH_3$ or $CH_3OH$ always requires delivery logistics for these liquid products.

Furthermore, ammonia (NH3) is a harmful pollutant for the environment (toxicity, odour, etc.) and regulations on this product are becoming increasingly severe.

Furthermore, the purchase price of these products fluctuates considerably which tends to reduce the global cost effectiveness of processes, particularly in the case of methanol.

Furthermore, production of hydrogen by electrolysis consumes a great deal of energy (of the order of 5 $kWh/Nm^3$ of $H_2$ produced) and this is not a good solution for production rates exceeding 50 $Nm^3/h$ in countries in which electricity is expensive.

Therefore these various hydrogen production processes have many disadvantages, and no existing production process can be considered to be fully satisfactory from the industrial point of view.

The problem that arises is then to be able to propose a hydrogen production process that is better than known processes, in other words with easier maintenance or implementation, lower investment cost, or that uses natural gas or LPG for the production of hydrogen and that requires few utilities (water, steam, etc.).

SUMMARY OF THE INVENTION

In other words, this invention is intended to propose a process for production of gaseous hydrogen that:

- does not consume large amounts of energy to maintain the hydrogen production reaction, in other words if possible using an auto-thermal reaction;
- with sufficient conversion efficiency from hydrocarbon to hydrogen;
- is compact, has a low investment cost and is easy to maintain and use;
- enables automatic start-up and operation in complete safety, preferably with no personnel in place;

enables the use of an inexpensive primary source of hydrocarbons;

that is appropriate for average production rates, in other words from 50 Nm³ to 300 Nm³/h.

The solution according to the invention is then a process for the production of a gaseous mixture containing at least hydrogen ($H_2$) and carbon monoxide (CO) starting from at least one hydrocarbon chosen from the group consisting of methane, ethane or a mixture of methane and ethane, or a mixture of butane and propane in which:

(a) a partial catalytic oxidation of at least one hydrocarbon is done at a temperature of less than 1200° C., at a pressure of 3 to 20 bars in the presence of oxygen or a gas containing oxygen, to produce hydrogen ($H_2$) and carbon monoxide (CO);

(b) a gaseous mixture containing at least hydrogen ($H_2$) and carbon monoxide (CO) is recovered;

(c) the gaseous mixture obtained in step (b) is cooled to a temperature of between −20° C. and +80° C.;

(d) the gaseous mixture obtained in step (c) is separated in order to produce a hydrogen rich gas flow;

and in which a gaseous mixture at a pressure of 3 to 20 bars is obtained from step (b) and/or step (c).

The process according to the invention may include one or several of the following characteristics, depending on the case:

in step (c), cooling is done by a gas-gas exchange, a gas-water exchange or sudden water cooling;

the hydrocarbon is methane or natural gas, and preferably the $CH_4/O_2$ volume flow ratio is between 1.5 and 2.1;

the gaseous mixture obtained in step (b) and/or step (c) is at a pressure of 4 to 15 bars;

step (a) is performed at a pressure of 4 to 15 bars;

the gas containing oxygen is a gaseous mixture containing nitrogen and oxygen, and preferably air;

the catalyst consists of at least one metal deposited on an inert support, and preferably the metal is nickel, rhodium, platinum and/or palladium or an alloy containing at least one of these metals;

the gaseous mixture obtained in step (b) contains approximately 30 to 40% (by volume) of hydrogen, 15 to 25% of CO and the remainder being nitrogen and possibly traces of $CO_2$, $H_2O$ or other inevitable impurities, and preferably the gaseous mixture obtained in step (b) contains approximately 31 to 34% (by volume) of hydrogen, 17 to 21% of CO and the remainder being nitrogen and possibly traces of $CO_2$, $H_2O$ or other inevitable impurities;

step (a) is performed in at least one endothermal reactor;

step (a) is performed at a temperature of between 600° C. and 1090° C. and preferably from 900 to 1000° C.;

in step (d), separation is used to produce a hydrogen rich gas flow containing at least 80% of hydrogen and preferably between 99.9% and 99.999999% by volume of hydrogen the separation performed in step (d) uses a PSA process, a TSA process or a membrane permeation separation using one or several membrane modules generating firstly the said hydrogen rich gas flow and secondly a waste-gas flow, preferably a PSA process to obtain pure hydrogen;

the waste-gas flow is sent to a cogeneration unit used to produce electricity, and preferably to a boiler;

it includes an additional step:

(e) the gaseous mixture obtained in step (b) is separated in order to eliminate at least part of the carbon dioxide and/or steam impurities that are present, if any, and thus produce a gaseous atmosphere with controlled contents of hydrogen, carbon monoxide and nitrogen;

the gaseous atmosphere produced with controlled contents of hydrogen, carbon monoxide and nitrogen is used for a metal heat treatment operation;

the separation made in step (d) uses a PSA process or a TSA process using at least two different adsorbers operating alternately, at least one of the adsorbers being in a regeneration phase while at least one of the other adsorbers is in a production phase of the said rich hydrogen gas flow;

the separation made in step (d) uses membrane permeation using one or several membrane modules generating firstly the said hydrogen rich gas flow and secondly a waste gas flow containing mainly nitrogen and carbon monoxide, and possibly residual hydrogen.

DETAILED DESCRIPTION OF THE PREFERRED EMBODIMENTS

The basic principle of this invention is to do partial oxidation of methane or LPG (natural gas usually contains mostly $CH_4$), and a percentage of $CO_2$, $N_2$ and heavier hydrocarbons (propane, butane). Natural gas or LPG is used for the purpose of this invention, but from a chemical point of view, the $CH_4$, propane and butane molecules are partially oxidized) in order to obtain a hydrogen/carbon monoxide mixture according to reaction (2) below:

$$CH_4 + \tfrac{1}{2} O_2 \rightarrow CO + 2H_2 \quad (2)$$

From the point of view of hydrogen production, this reaction leads to the formation of two hydrogen molecules for one methane molecule.

Reaction (2) is exothermal but the enthalpy of the reaction is not sufficient to reach high temperatures, for example 1300° C. to 1500° C.

Part of the fuel has to be burned in conventional combustion processes, in other words processes without a catalyst.

The solution according to this invention is based on the principle of using combustion in a catalytic medium to achieve partial oxidation of the $CH_4/\tfrac{1}{2} O_2$ mixture into $H_2$ and CO at lower temperatures, typically 700 to 1100° C.

Partial oxidation by catalysis has several advantages including the following:

the hydrogen extraction efficiency is close to 100% since the ratio of the volume of $H_2$ produced to the volume of $CH_4$ consumed is close to 2;

it does not require any management of steam, unlike steam reformers;

it can be done with air, with a ratio $O_2/CH_4$ close to the stoichiometry of the partial oxidation reaction and therefore with a minimum air flow to be compressed; and it does not require any addition of heat by a burner as in the case of steam reformers.

Figure 1:
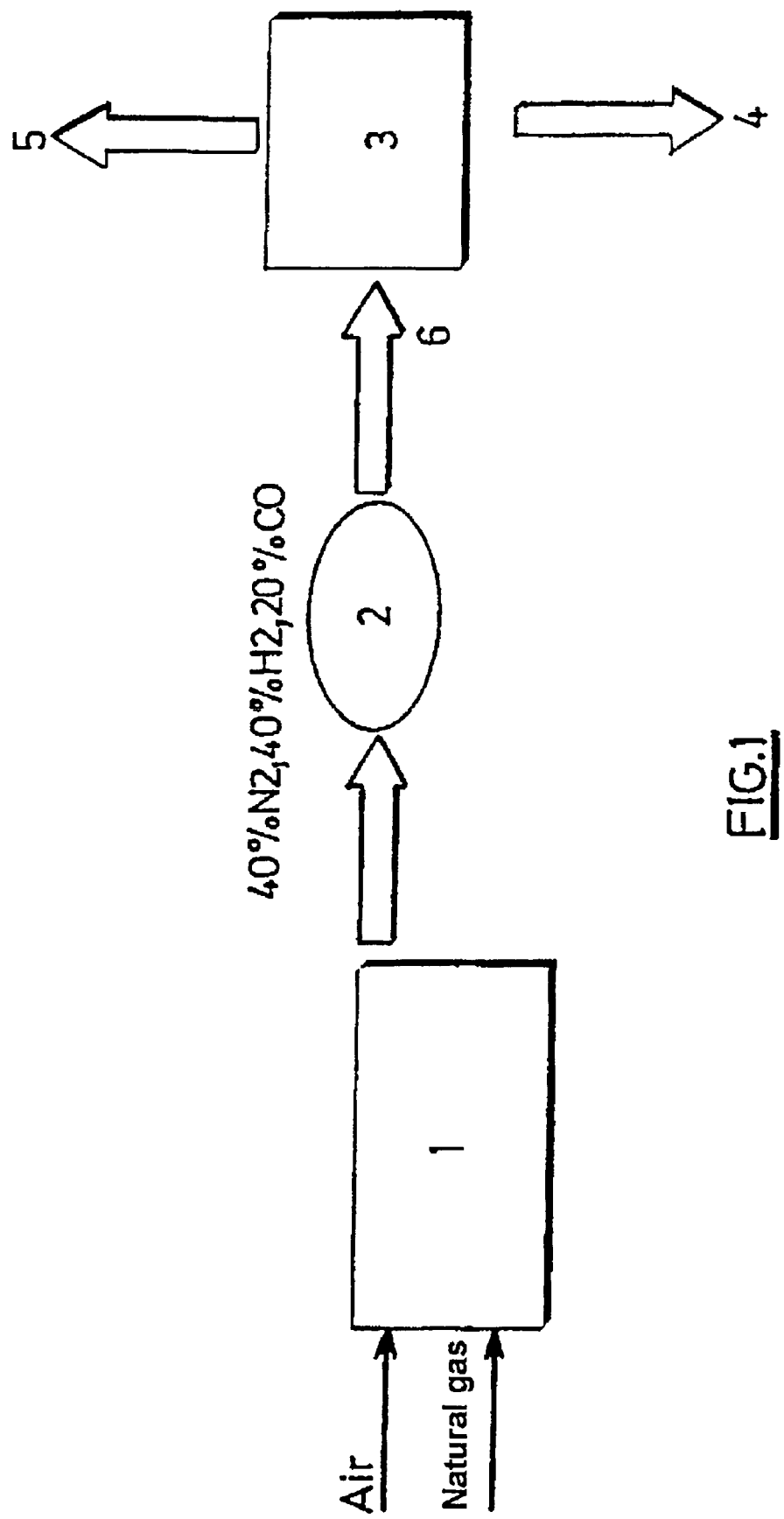
FIG. 1 of the Drawing depicts a process for preparing a hydrogen rich gaseous mixture.

As shown diagrammatically in FIG. 1, the principle according to the invention consists of producing a hydrogen rich gaseous mixture (30 to 40% $H_2$, about 20% CO and the remainder being mainly $N_2$ and a few % of $CO_2$, $H_2O$ and other inevitable impurities) by partial catalytic oxidation of hydrocarbons such as methane or natural gas.

The gaseous mixture produced is then cooled using a gas-gas or gas-water exchanger, or by flash cooling with water, and is then sent to an adsorption separation unit (PSA), possibly after a step to eliminate soot or other generated impurities.

If the mixture is generated under pressure at the partial catalytic oxidation reactor, there is no point in using a compressor to supply the PSA unit.

The PSA process is then supplied under pressure by the hydrogen rich mixture and it produces pure hydrogen under pressure (purity>99.9%).

The off gas from the PSA, at a pressure close to atmospheric pressure or higher if it is required to make use of the off gas, for example at a pressure of 1.5 bars, rich in CO (about 28%) and still containing hydrogen (about 15%) is disposed of in a flare or in a boiler burner to achieve heat cogeneration.

The size of PSA unit valves is made as compact as possible to minimize the equipment investment, and preferably one or more rotary valves are used.

This technology is also a means of reducing the cycle time of the PSA process, and the typical duration of cycles is 0.1 to 3 minutes.

Thus, the productivity of the system is increased and consequently the volume of receptacles containing adsorbents for a given produced gas quantity is smaller.

The pure hydrogen produced is then delivered under pressure into the customer's network.

Therefore, the process according to the invention eliminates the so called gas to water reaction step: $CO+H_2O \rightarrow CO_2+H_2$.

The hydrogen production efficiency is not as good in this case, but the energy efficiency is no longer overriding for production of small quantities of hydrogen (less than 300 m3/h).

The proportion of the investment cost in the total price of the gas produced becomes the most important.

As a result, simplifying the process (catalytic gas to water conversion reactor, demineralised water production unit) is more useful to produce one molecule of hydrogen for each molecule of $CH_4$ consumed.

Furthermore, another extremely important element in the case of hydrogen production on site is maintenance and simplicity of use since simplification of the process reduces maintenance and operating costs of the unit.

According to one particular preferred embodiment of the invention, partial catalytic oxidation is done using a reactor with a fixed bed catalyst with axial or radial flow operating at high pressure, for example of the order of 5 to 20 bars, unlike the "endothermal" generators usually used in various heat treatment applications that usually operate a lower pressures, in other words typically below 1.5 bars.

Figure 2:
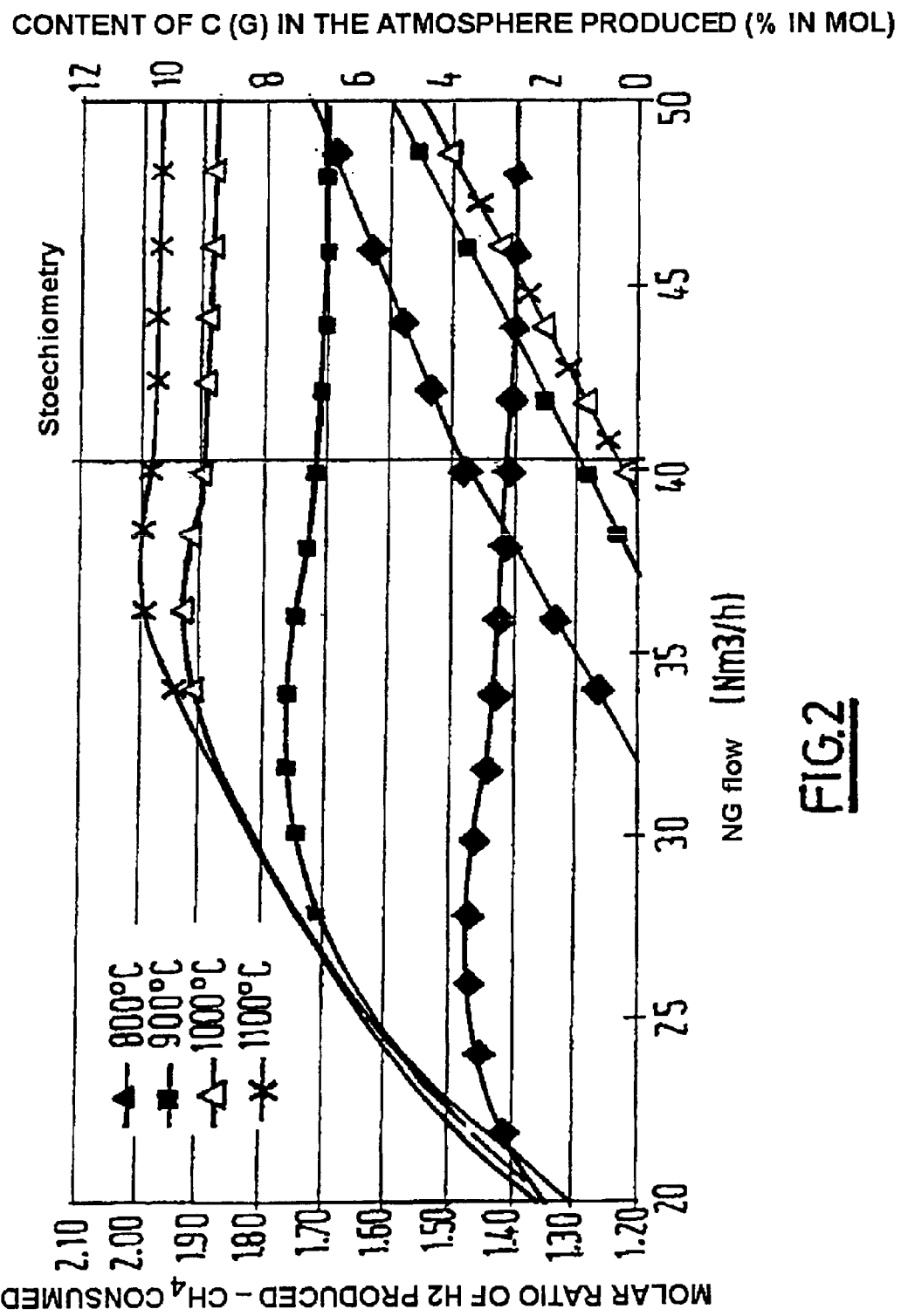
FIG. 2 of the Drawing graphically depicts the composition of a gaseous atmosphere produced by a process in accordance with the present invention.
Figure 3:
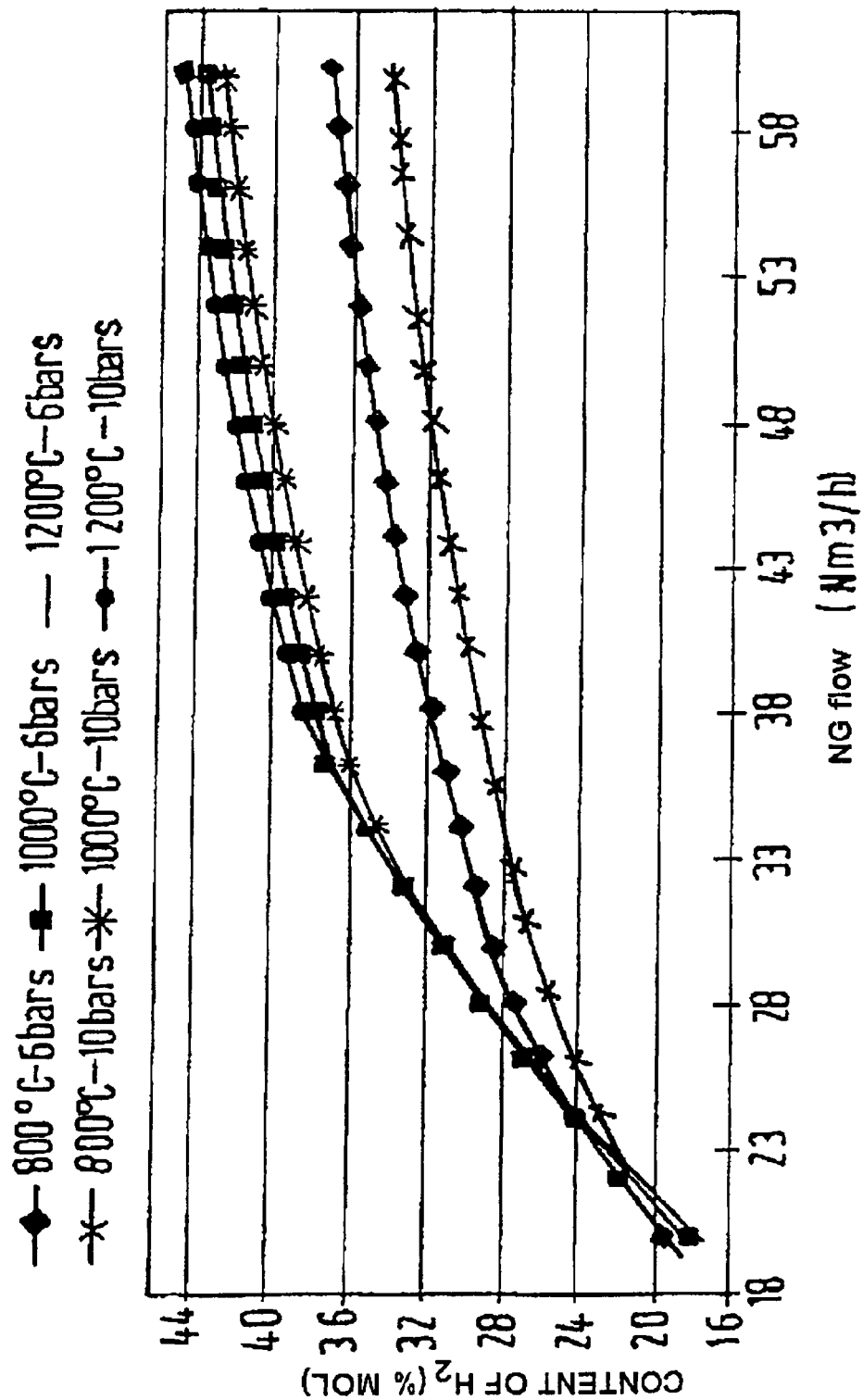
FIG. 3 of the Drawing graphically depicts the impact of the natural gas/air mixture on the production of hydrogen.

FIG. 2 attached shows an evaluation starting from calculations based on a thermodynamic equilibrium, of the composition of the gaseous atmosphere produced by a process according to the invention that clearly shows that conversion rates are more than 90%, and FIG. 3 shows a similar evaluation of the influence of the richness of the natural gas/air mixture on the formation of soot and on the hydrogen efficiency in order to maximize the quantity of hydrogen produced with respect to the quantity of natural gas consumed.

More precisely, FIG. 2 shows firstly the variation of the ratio of $H_2$ produced per $Nm^3$ of natural gas consumed as a function of the temperature in the case of a reaction using 100 $Nm^3$/h of air and secondly the variation of the molar composition of solid carbon in the atmosphere produced as a function of the temperature.

For each temperature studied, it is clear that the maximum hydrogen efficiency is located within the range of low contents of natural gas in the natural gas/air mixture.

This maximum is particularly high when the temperature is high and always corresponds to a composition of natural gas/air mixture in which the quantity of solid carbon produced is very low or even negligible.

Furthermore, the CH4+½ O2→CO+2H2 reaction takes place with an increase in the number of moles, and consequently it is thermodynamically improved by a reduction of the total pressure.

This influence is demonstrated in FIG. 3 that shows the variation of the hydrogen content in the atmosphere produced as a function of the natural gas flow, for 2 different usage pressures and 3 different usage temperatures.

Note also that as the temperature increases, the difference between the hydrogen composition obtained at 10 bars and at 6 bars reduces.

Therefore in other words, the principle of the invention is based on the production of a hydrogen rich gaseous mixture (for example 36% $H_2$, 41% $N_2$, 20% CO) by partial catalytic oxidation preferably operating under pressure (of the order of 10 bars) and at a temperature of less than 1100° C., and preferably less than 1000° C.

In this respect, the following procedures may be envisaged in order to implement the process according to the invention:

pressure: 5 to 20 bars absolute temperature: 650 to 1000° C., knowing that conventional endothermal generators available on the market operate at higher temperatures (>1100° C.)

richness of the $CH_4/O_2$ mixture: the ratio of the $CH_4$ volume flow to the oxygen volume flow is between 1 and 2.5 and is preferably between 1.5 and 2.

Figure 4:
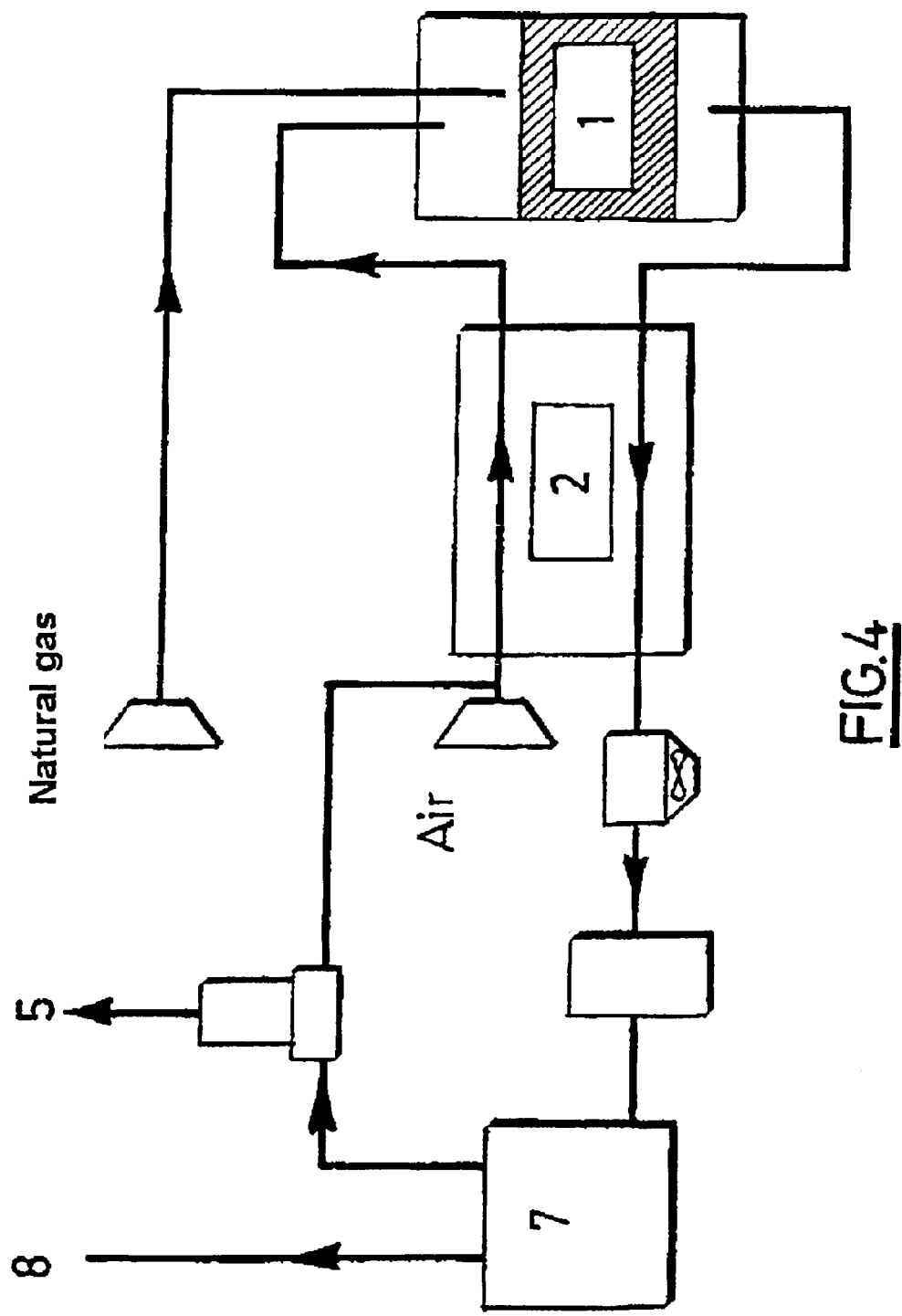
FIG. 4 of the Drawing schematically depicts a process in accordance with the present invention.

As shown in FIGS. 1 and 4, the catalytic reactor 1 supplied with air and natural gas may be fully or partially filled with catalyst, for example the catalyst bed may be supported on an inert depth of material such as ceramic balls, inactive alumina, etc., or may be sandwiched between these materials.

The catalyst is composed of an active metallic phase deposited on a porous support. The metal may be nickel or a noble metal such as platinum, rhodium, palladium or a combination of these metals, and the support may be alumina, zeolite, silica, an aluminosilicate or silicon carbide.

The separation unit 7 on the output side of the catalytic reactor 1 may be a PSA or TSA type unit or a unit using polymer membranes.

Furthermore, soot present in the gas flow output from the catalytic reactor 1 may be eliminated in 2 by a cyclone device, a mechanical filter, an electrostatic deduster or a similar device.

The invention may be used to produce pure hydrogen or to produce specific metal heat treatment atmospheres.

Thus, in order to produce pure hydrogen, the separation unit may for example be a PSA unit or a membrane system, as shown diagrammatically in FIG. 1 attached.

The PSA unit (in 3) is supplied (in 6) under pressure by the hydrogen rich gaseous mixture so that it can produce pure hydrogen (in 4) under pressure.

The off gas, at a pressure close to atmospheric pressure and rich in CO (27%) and still containing hydrogen (~15%) is sent (in 5) to a flare or a boiler burner to achieve heat cogeneration.

The productivity of the PSA system is increased by working with short adsorption cycles, typically of the order of 60 seconds or less, and consequently the volume of PSA adsorbers is lower for the same quantity of gas produced.

The pure hydrogen produced (in 4) is then delivered under pressure into the customer's network.

Therefore, the process according to the invention eliminates the conventional gas to water reaction step:

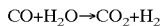

$$CO + H_2O \rightarrow CO_2 + H_2$$

Therefore, the hydrogen production efficiency is not as good, but in the context of producing small quantities of hydrogen, in other words less than 300 Nm³/h, the problem of energy efficiency is no longer overriding. The proportion of the investment cost in the price of the gas produced becomes the most important.

In this context, the fact of simplifying the process, in other words eliminating the "shift conversion" catalytic reactor and the demineralised water production unit is more useful than increasing the hydrogen production efficiency.

Furthermore, a second extremely important element in the case of hydrogen production "on site" is maintenance and ease of use. Simplification of the process can reduce the maintenance and operation costs for the unit, since these costs are of the same order as the costs for natural gas consumption and equipment depreciation.

Furthermore, as shown diagrammatically in FIG. 4 attached, in order to produce specific heat treatment atmospheres, the separation unit 7 is a TSA (Temperature Swing Adsorption) unit or a PSA (Pressure Swing Adsorption) unit supplied (in 6) with gas at a pressure of 10 bars and comprising 1 to n beds which contain adsorbents (active alumina, zeolite, active carbon), which produces (in 8) a reducing CO/H₂ mixture free of oxidizing compounds (H₂O, CO₂) themselves being stopped by a separation unit 7 that eliminates water vapour and carbon dioxide contained in the gas flow (contents<1 ppm of water). For comparison, existing generators produce an atmosphere containing a molar content of water less than 1%, which is 10 000 times higher.

Adsorbers in the separation unit 7 may be regenerated using nitrogen available on site or with part of the product, or with another dry gas with a small content of CO₂ present on the site.

What is claimed is:

1. Process for the production of a gaseous mixture containing at least hydrogen (H₂) and carbon monoxide (CO) starting from at least one hydrocarbon selected from the group consisting of methane, ethane, a mixture of methane and ethane, and a mixture of butane and propane in which:
   (a) a partial catalytic oxidation without moderating agents of said at least one hydrocarbon is done at a temperature of less than 1200° C., at a pressure of 3 to 20 bars in the presence of a catalyst and oxygen or a gas containing oxygen, to produce hydrogen (H₂) and carbon monoxide (CO), the catalyst composed of an active metallic phase deposited on a porous support;
   (b) a gaseous mixture containing at least hydrogen (H₂) and carbon monoxide (CO) is recovered;
   (c) the gaseous mixture obtained in step (b) is cooled to a temperature of between −20° C. and +80° C.;
   (d) the gaseous mixture obtained in step (c) is separated in order to produce a hydrogen rich gas flow and a waste gas flow;

and in which a gaseous mixture at a pressure of 3 to 20 bars is obtained from step (b) and/or step (c).

2. Process according to claim 1, wherein in step (c), cooling is done by a gas-gas exchange, a gas-water exchange or sudden water cooling.

3. The process according to claim 1, wherein the hydrocarbon is methane or natural gas.

4. The process according to claim 1, wherein the gaseous mixture obtained in step (b) and/or step (c) is at a pressure of 4 to 20 bars.

5. The process according to claim 1, wherein step (a) is performed at a pressure of 4 to 15 bars.

6. The process according to claim 1, wherein the gas containing oxygen is a gaseous mixture containing nitrogen and oxygen.

7. The process according to claim 1, wherein the partial oxidation catalyst consists of at least one metal deposited on an inert support.

8. The process according to claim 1, wherein the gaseous mixture obtained in step (b) contains approximately 30 to 40% (by volume) of hydrogen, 15 to 25% of CO and the remainder being nitrogen and possibly traces of CO₂, H₂O or other inevitable impurities.

9. The process according to claim 1, that wherein step (a) is performed in at least one endothermal reactor.

10. The process according to claim 1, wherein step (a) is performed at a temperature of between 600° C. and 1090° C.

11. The process according to claim 1, wherein in step (d), separation is used to produce a hydrogen rich gas flow containing at least 80% by volume of hydrogen.

12. The process according to claim 1, wherein the separation performed in step (d) uses a PSA process, a TSA process or a membrane permeation separation using one or several membrane modules generating firstly the said hydrogen rich gas flow and secondly a waste gas flow.

13. The process according to claim 1, wherein the waste-gas flow is sent to a cogeneration unit used to produce electricity.

14. The process according to claim 1, which includes an additional step:
   (e) the gaseous mixture obtained in step (b) is separated in order to eliminate at least part of the carbon dioxide impurities that are present, and thus produce a gaseous atmosphere with controlled contents of hydrogen, carbon monoxide and nitrogen.

15. The process according to claim 14, wherein the gaseous mixture produced with controlled contents of hydrogen, carbon monoxide and nitrogen is used for a metal heat treatment operation.

16. The process according to claim 1, wherein the separation made in step (d) uses a PSA process or a TSA process using at least two different adsorbers operating alternately, at least one of the adsorbers being in a regeneration phase while at least one of the other adsorbers is in a production phase of the said rich hydrogen gas flow.

17. The process according to claim 1, wherein the separation made in step (d) uses membrane permeation using one or several membrane modules generating firstly a hydrogen rich gas flow and secondly a waste gas flow containing mainly nitrogen and carbon monoxide, and possibly residual hydrogen.

18. The process according to claim 2, wherein the hydrocarbon is methane or natural gas.

19. The process according to claim 3, wherein the CH₄/O₂ volume flow ratio is between 1.5 and 2.1.

20. The process according to claim 18, wherein the CH₄/O₂ volume flow ratio is between 1.5 and 2.1.

21. The process according to claim 2, wherein the gaseous mixture obtained in step (b) and/or step (c) is at a pressure of 4 to 20 bars.

22. The process according to claim 2, wherein step (a) is performed at a pressure of 4 to 15 bars.

23. The process according to claim 2, wherein the gas containing oxygen is a gaseous mixture containing nitrogen and oxygen.

24. The process according to claim 6, wherein the gas containing oxygen is air.

25. The process according to claim 2, wherein the partial oxidation catalyst consists of at least one metal deposited on an inert support.

26. The process of claim 7, wherein the metal is nickel, rhodium, platinum and/or palladium, or an alloy containing at least one of these metals.

27. The process according to claim 2, wherein the gaseous mixture obtained in step (b) contains approximately 30 to 40% (by volume) of hydrogen, 15 to 25% of CO and the remainder being nitrogen and possibly traces of $CO_2$, $H_2O$ or other inevitable impurities.

28. The process of claim 8, wherein the gaseous mixture obtained in step (b) contains from about 31 to 34% by volume of hydrogen, from about 17 to 21% of CO and the remainder being nitrogen and possible traces of $CO_2$, $H_2O$ or other impurities.

29. The process according to claim 2, wherein step (a) is performed in at least one endothermal reactor.

30. The process according to claim 2, wherein step (a) is performed at a temperature of between 600° C. and 1090° C.

31. The process of claim 10, wherein step (a) is performed at a temperature of between 900° C. and 1000° C.

32. The process according to claim 2, wherein in step (d), separation is used to produce a hydrogen rich gas flow containing at least 80% by volume of hydrogen.

33. The process according to claim 11, wherein the separation of step (d) is used to produce a hydrogen rich gas flow containing between 99.9% and 99.999999% by volume of hydrogen.

34. The process according to claim 2, wherein the separation performed in step (d) uses a PSA process, a TSA process or a membrane permeation separation using one or several membrane modules generating firstly the said hydrogen rich gas flow and secondly a waste gas flow.

35. The process according to claim 12, wherein a PSA process is used to obtain pure hydrogen.

36. The process according to claim 2, wherein the waste-gas flow is sent to a cogeneration unit used to produce electricity.

37. The process according to claim 13, wherein the waste gas glow is sent to a boiler.

38. The process according to claim 2, which includes an additional step:
(e) the gaseous mixture obtained in step (b) is separated in order to eliminate at least part of the carbon dioxide and/or steam impurities that are present, if any, and thus produce a gaseous atmosphere with controlled contents of hydrogen, carbon monoxide and nitrogen.

39. The process according to claim 38, wherein the gaseous mixture produced with controlled contents of hydrogen, carbon monoxide and nitrogen is used to a metal heat treatment operation.

40. The process according to claim 2, wherein the separation made in step (d) uses a PSA process or a TSA process using at least two different adsorbers operating alternately, at least one of the adsorbers being in a regeneration phase while at least one of the other adsorbers is in a production phase of the said rich hydrogen gas flow.

41. The process according to claim 2, wherein the separation made in step (d) uses membrane permeation using one or several membrane modules generating firstly a hydrogen rich gas flow and secondly a waste gas flow containing mainly nitrogen and carbon monoxide, and possibly residual hydrogen.

42. A process for the production of a gaseous mixture containing at least hydrogen ($H_2$) and carbon monoxide (CO) starting from at least one hydrocarbon selected from the group consisting of methane and natural gas, said process comprising:
(a) conducting a partial catalytic oxidation without moderating agents of said at least one hydrocarbon at a temperature between 650° C. and 1000° C., at a pressure of 4 to 15 bars in the presence of a catalyst and oxygen or a gas containing oxygen, to produce hydrogen ($H_2$) and carbon monoxide (CO), said catalyst composed of nickel, rhodium, platinum and/or palladium or an alloy containing at least one of these metals deposited on a porous support;
(b) recovering a gaseous mixture containing at least hydrogen and carbon monoxide;
(c) cooling the gaseous mixture from step (b) to a temperature between −20° C. and +80° C. by a gas-gas exchange, a gas-water exchange or sudden water cooling;
(d) separating the gaseous mixture from step (c) to produce a hydrogen rich gas flow containing at least 80% by volume of hydrogen and a waste gas flow, said separation being performed by a PSA process, a TSA process or a membrane permeation separation using at least one membrane module; wherein the gaseous mixture obtained instep (b) or (c) is at a pressure of 4 to 15 bars, the $CH_4/O_2$ volume flow ratio is between 1.5 and 2.1, the gaseous mixture obtained in step (b) contains approximately 30 to 40% (by volume) of hydrogen, 15 to 25% of CO and the remainder being nitrogen and possibly traces of $CO_2$, $H_2O$ or other inevitable impurities, and the gaseous mixture obtained in step (b) is treated in order to eliminate at least part of the carbon dioxide impurities that are present, and thus produce a gaseous atmosphere with controlled amounts of hydrogen, carbon monoxide and nitrogen.

43. The process of claim 42, wherein the gas containing oxygen in step (a) is air and the gaseous mixture in step (b) contains 31 to 34% by volume $H_2$, 17 to 21% CO and the remainder being nitrogen and other impurities.

* * * * *